United States Patent
Rubinstein et al.

(10) Patent No.: US 8,503,534 B2
(45) Date of Patent: Aug. 6, 2013

(54) MULTI-BUS ARCHITECTURE FOR A VIDEO CODEC

(75) Inventors: Jorge Rubinstein, Newton, MA (US); Albert Rooyakkers, Scotts Valley, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 597 days.

(21) Appl. No.: 12/765,294

(22) Filed: Apr. 22, 2010

(65) Prior Publication Data

US 2011/0261884 A1 Oct. 27, 2011

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC .............. 375/240.16; 375/240.29; 348/571; 348/580

(58) Field of Classification Search
USPC ................ 375/240; 348/714–717, 720–721
See application file for complete search history.

(56) References Cited

U.S. PATENT DOCUMENTS

| | | | | |
|---|---|---|---|---|
| 5,598,514 A * | 1/1997 | Purcell et al. ................ | 345/418 |
| 5,630,033 A * | 5/1997 | Purcell et al. ................ | 345/418 |
| 6,064,450 A * | 5/2000 | Canfield et al. .......... | 375/240.29 |
| 6,088,047 A * | 7/2000 | Bose et al. ..................... | 345/547 |
| 6,122,320 A * | 9/2000 | Bellifemine et al. ......... | 375/240 |
| 6,122,442 A * | 9/2000 | Purcell et al. ................. | 345/620 |
| 6,215,822 B1 * | 4/2001 | Bose et al. ............... | 375/240.16 |
| 6,538,656 B1 * | 3/2003 | Cheung et al. ................ | 345/519 |
| 6,573,905 B1 * | 6/2003 | MacInnis et al. ............. | 345/629 |
| 6,768,774 B1 * | 7/2004 | MacInnis et al. ........ | 375/240.15 |
| 6,975,324 B1 * | 12/2005 | Valmiki et al. ................ | 345/555 |
| 7,256,790 B2 * | 8/2007 | Valmiki et al. ................ | 345/530 |
| 7,330,595 B2 * | 2/2008 | Park et al. ..................... | 382/236 |
| 7,446,774 B1 * | 11/2008 | MacInnis et al. ............. | 345/519 |
| 7,659,900 B2 * | 2/2010 | MacInnis et al. ............. | 345/505 |
| 7,991,049 B2 * | 8/2011 | MacInnis et al. ........ | 375/240.15 |
| 8,189,678 B2 * | 5/2012 | Valmiki et al. ........... | 375/240.24 |
| 2004/0212730 A1 * | 10/2004 | MacInnis et al. ............. | 348/441 |
| 2008/0219572 A1 * | 9/2008 | Kim et al. ..................... | 382/236 |
| 2010/0177585 A1 * | 7/2010 | Rubinstein et al. ...... | 365/230.05 |
| 2010/0177828 A1 * | 7/2010 | Rubinstein et al. ...... | 375/240.26 |
| 2011/0280307 A1 * | 11/2011 | MacInnis et al. ........ | 375/240.15 |

* cited by examiner

*Primary Examiner* — Christopher S Kelley
*Assistant Examiner* — Asmamaw G Tarko
(74) *Attorney, Agent, or Firm* — North Weber & Baugh LLP (57) ABSTRACT

Embodiments of the present invention relate to a multi-bus architecture within a video codec that discretely and efficiently transports video components within the codec. This multi-bus architecture provides a relatively more efficient transport mechanism because the various buses are designed to specifically address unique characteristics of the video components or parameters being processed within the codec.

29 Claims, 10 Drawing Sheets

| TYPE OF BLOCK OBJECT | CLASSIFICATION | DIMENSION | DETAIL |
|---|---|---|---|
| Video object | Luma objects | One dimensional | Horizontal and vertical luma pixel vector |
| | | Two dimensional | 16x16 macroblock object |
| | | | 4x4 luma object |
| | | | 4x8 luma object |
| | | | 8x4 luma object |
| | | | 8x8 luma object |
| | | | 8x16 luma object |
| | | | 16x8 luma object |
| | | | Quarter Pel object[1] |
| | Chroma objects | One dimension | Horizontal and vertical chroma pixel vector |
| | | Two dimensional | 8x8 chroma object |
| | Motion vector objects | | x,y motion vector |
| Data object | Structural | | Slice, nearest neighbor information |
| | Parametric | | Quantization, prediction mode, etc |

MULTI-BUS ARCHITECTURE FOR A VIDEO CODEC

BACKGROUND

A. Field of the Invention

The present invention relates generally to an integrated, loosely-pipelined video codec, and more particularly to a multi-bus architecture within the video codec architecture that improves encoding performance and power consumption.

B. Background of the Invention

The importance of digital video technology is well understood by one of skill in the art. Over the past few years, the digital video market has exploded in response to improvements in video compression and applications that allow a user to record, manipulate, store and transmit digital video over a network. The ability to transmit and display high-quality digital video has significantly improved as compression techniques have evolved. Additionally, the video market has seen a meaningful reduction in the size and power consumption of video devices that record, transmit, receive and display digital video content.

The representation of video within a digital framework requires significantly large amounts of binary data to be generated, transmitted, stored and processed. Video compression reduces this amount of data by using both spatial image and temporal motion compression techniques within a digital video stream. Numerous compression algorithms have been developed that compress and encode digital video data in both the spatial and temporal domains. One example is the H.264 standard that defines processes and parameters in which digital video may be encoded and decoded.

Figure 1:
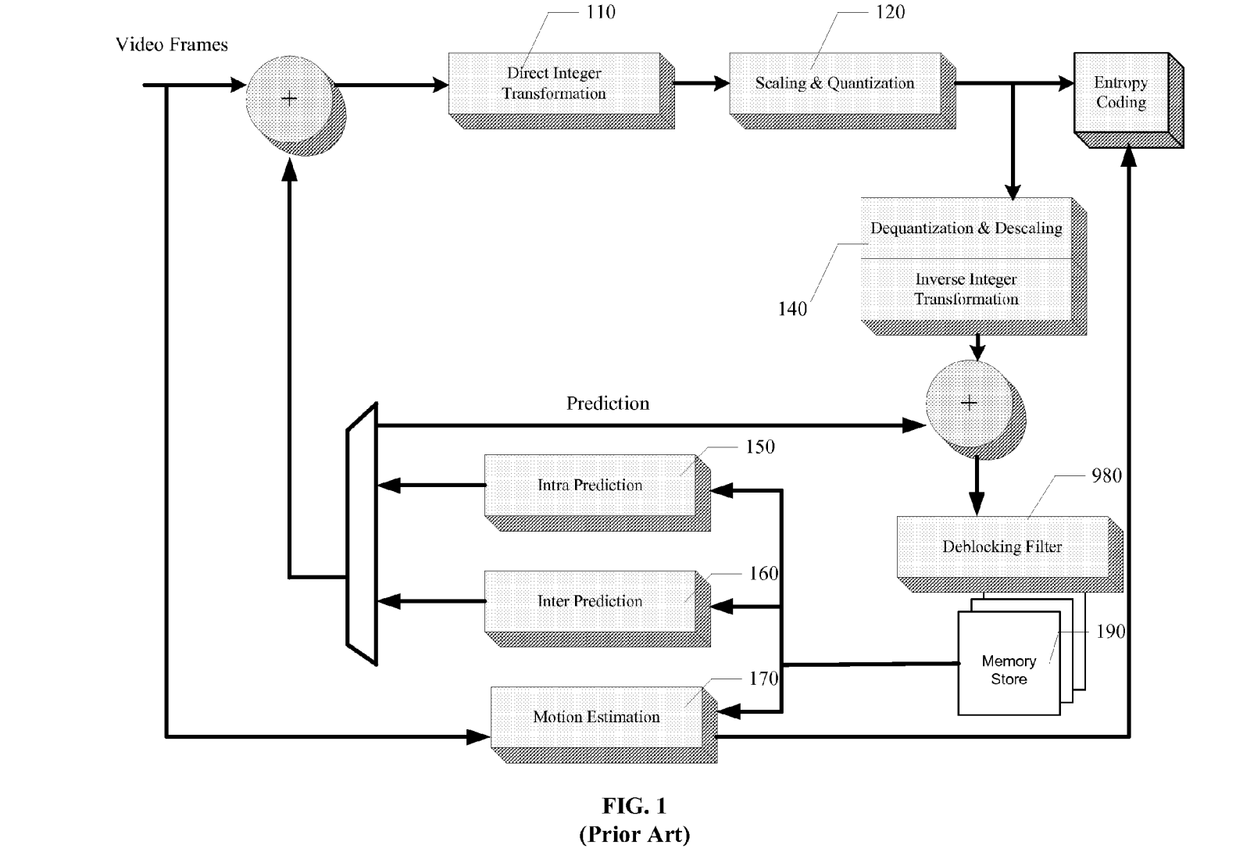
FIG. 1 (hereinafter, "FIG.") generally illustrates a representative video codec as set forth in the H.264 standard.

FIG. 1 generally illustrates a video encoding architecture that may be used in compliance within the H.264 standard. Video frames are received from an external source and divided into video component macroblocks including both luma and chroma blocks. These macroblocks are processed to determine a preferred encoding or prediction mode. The identification of a prediction mode for a macroblock represents a time consuming, computationally intensive process in which a diverse set of pixel data is processed, manipulated, fetched from and stored in memory. Additionally, the delivery of this pixel data to a processing device within the codec oftentimes requires formatting procedures, such as deserialization or demultiplexing of an incoming data signal, so that processing elements can properly operate on the data. To further complicate the procedure, the identification of an appropriate prediction mode is extremely time sensitive in that the mode must be determined within a very limited time window. All of these factors typically result in a design that sacrifices the quality of compression in order to meet the timing restraints, power consumption criteria, or footprint requirements of a video codec.

During inter mode prediction, a current macroblock is provided to a motion estimation module 170 and reference frames, temporally located from the current macroblock, are fetched from the memory store 190. The motion estimation module 170 iteratively analyzes a plurality of reference blocks relative to the current macroblock to identify an appropriate motion vector. If such an appropriate motion vector is identified, then an inter prediction module 160 may finely adjust the motion vector by performing half and/or quarter pel operations on the temporally located reference block. These half and quarter pel operations can be extremely computationally intensive due to the very large number of arithmetic operations performed as well as the number of read and write operations performed in memory.

During intra mode prediction, the intra prediction module 150 analyzes a macroblock within a frame relative to spatially located reference blocks within the same frame. This analysis attempts to identify a reference block and corresponding intra prediction mode for the macroblock.

This prediction analysis requires that a residual be generated and compressed for each reference block under test. This residual represents a difference between the current macroblock and the reference block, which residual is provided to a direct integer transformation module 110. The residual is transformed using an integer transformation into a set of spatial frequency coefficients. This transformation is analogous to a transformation from a time domain signal into a frequency domain signal.

The frequency coefficients are provided to a scaling & quantization module 120 which then generates a quantized and scaled signal. In effect, the quantization process divides the frequency coefficients by an integer scaling factor, thereafter truncating the signal. This process usually introduces a modification in the compressed block that requires compensation when the block is later regenerated.

The amount of error introduced into the video signal by the encoding process may be determined by reconstructing the encoded frame. Reconstruction occurs by a dequantization & descaling module and inverse integer transformation module 140, which reverse quantizes the video signal resulting in a rescaled signal. This rescaled signal is then inversely transformed to produce a reconstructed macroblock.

This reconstructed macroblock may be compared to the original macroblock to identify the error introduced by the compression process. As a result, the effectiveness of the different prediction modes may be compared to identify a preferred mode for a particular block. Once the preferred mode has been identified, an entropy coder 130 encodes the macroblock for transmission.

As digital video continually becomes more relevant in today's society and the digital video markets exponentially expand, the importance of optimizing the compression and encoding of digital video is apparent. One significant factor in this optimization is the need to reduce computational latency. This is especially important for real-time video applications including video conferencing, security and monitoring, interactive gaming and others. Another significant factor in this optimization is the ability to more efficiently manage the transportation of diverse sets of data within video codec architectures.

SUMMARY OF THE INVENTION

Embodiments of the present invention relate to a multi-bus architecture within a video codec that discretely and efficiently transports video components within the codec. This multi-bus architecture provides a relatively and substantially more efficient transport mechanism because the various buses are designed to specifically address unique characteristics of the video components or parameters being processed within the codec. Comparatively, prior art, centralized systems attempt to "fit" video data within a system-wide transport and processing architecture which results in codec inefficiencies.

In certain embodiments of the invention, the multi-bus architecture supports a pipelined system or loosely-pipelined system in which data processing is performed in a massively paralleled architecture. This architecture transports blocks of video or data (hereinafter, "objects") using discrete buses that are designed to efficiently transmit a particular object type and/or classification. The video objects may be defined based on the size, function and/or type of video or data being transported. These buses connect within corresponding paralleled logic in certain processing elements such that objects are transported and processed in parallel to improve encoding performance and power consumption.

A loosely-pipelined system may be considered a system in which the system is not strictly pipelined from the point of view that not all processing elements are busy at the same time, processing different stages of different macroblocks. However, there are processing elements that are working simultaneously, such as a entropy encoder and a direct integer transform processing element that is used in prediction optimization and is clocked simultaneously with the prediction processing elements.

In one embodiment of the invention, the multi-bus architecture comprises at least one luma bus, at least one chroma bus, at least one motion vector bus and at least one parameter bus. The characteristics of each of these buses relate to attributes of the objects that are transported thereon as well as processing demands of the object within a processing element(s). These bus structures allow a hardware encoder to manipulate large aggregates of data in a simple manner and result in a set of hardware elements that can be handled and integrated together in an efficient manner. For example, the width of a luma bus may be massively large such that operations performed on the luma block may be performed on a massively parallel scale without having to deserialize or demultiplex the object. In other examples, the multi-bus architecture allows an efficient data fetch procedure in which reference blocks are efficiently retrieved from a distributed cache within the codec architecture.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims herein.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

The present invention provides a multi-bus architecture within a video codec that provides a transport system in which video components and parameters are efficiently transmitted. In certain embodiments of the invention, the multi-bus architecture supports a pipelined/loosely-pipelined system in which data processing is performed in a massively paralleled architecture. This architecture transports blocks of video or data (hereinafter, "objects") using discrete buses that are designed to efficiently transmit a particular object type and/or classification. These buses connect within corresponding paralleled logic within certain processing elements such that objects are transported and processed to improve encoding performance, computational latency and power consumption.

Figure 2:
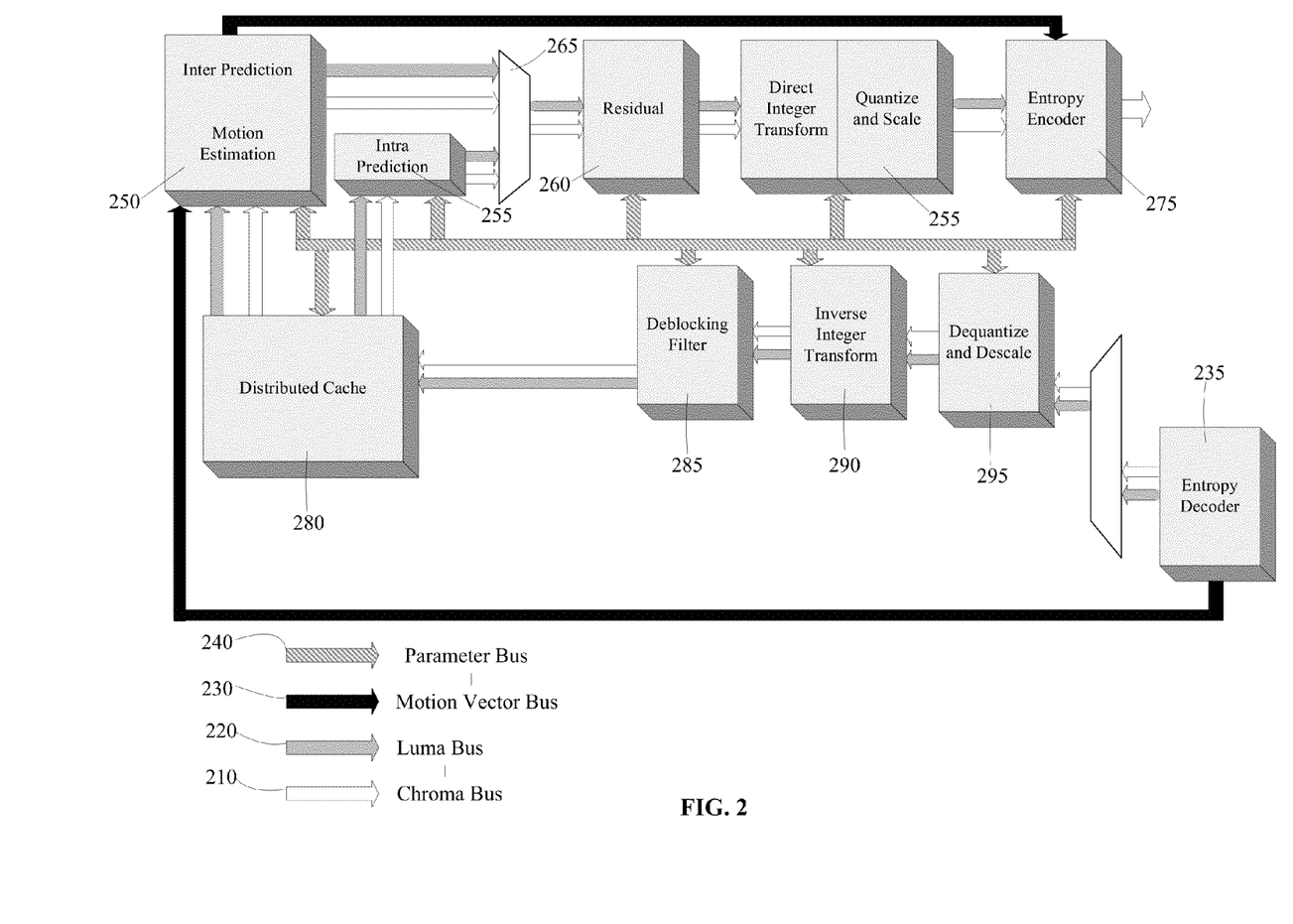
FIG. 2 is a system level illustration of a multi-bus video codec architecture according to various embodiments of the invention.

FIG. 2 illustrates generally an integrated video codec in which different objects are transported within the codec using a multi-bus architecture according to various embodiments of the invention. This multi-bus architecture provides a relatively more efficient transport mechanism of video because the various buses are designed to specifically address unique video components or parameters being processed within the codec. Comparatively, prior art, centralized systems attempt to "fit" video data within a system-wide transport and processing architecture which results in codec inefficiencies.

Referring to FIG. 2, the multi-bus architecture is comprised of a chroma bus 210, a luma bus 220, a motion vector bus 230 and a parameter bus 240, each of which discreetly transports an object type and/or classification within the integrated codec. Each of these different object types and classification, of which a more detailed description is provided later, contains different characteristics and processing requirements that are addressed by a corresponding bus(es). According to various embodiments of the invention, the luma bus 220 transports luma macroblocks, luma reference blocks, luma sub-blocks (e.g., 4×4 objects, 4×8 object . . . 8×16 objects), and horizontal and vertical luma pixel vectors. The chroma bus 210 transports 8×8 chroma objects and horizontal and vertical chroma pixel vectors. The motion vector bus 230 transports motion vectors objects (i.e., x, y motion vector data). The parameter bus 240 transports data objects which may include structural objects (e.g., slice, nearest neighbor information) as well as parametric objects (e.g., quantization modes, prediction modes, etc.).

FIG. 2 also provides one example in which the multi-bus architecture provides inter-connectivity between various processing elements within the integrated codec. One skilled in the art will recognize that numerous other inter-connectivity designs of an integrated codec may be realized within the scope of the present invention. One advantage of this multi-bus architecture is that data is delivered to processing elements in a paralleled format that is equivalent and/or related to parallel logic within the processing element so that intermediary components, such as serializers and deserializers, are not required.

As shown, an inter prediction/motion estimation processing element 250 receives chroma and luma objects from a distributed cache 280 and motion vector information from entropy encoder 235 so that motion estimation and inter prediction operations may be performed for a particular macroblock. The intra prediction estimation processing element 255 also receives chroma and luma objects (which many include horizontal and vertical luma pixel vectors) from the distributed cache 280. One skilled in the art will recognize that various distributed cache implementations may be used including breaking the cache into discrete cache modules that support the inter prediction processing element 250 and the intra prediction processing element 255.

A multiplexer 265 or other switching device is provided that selects luma and chroma objects from either the inter prediction processing element 250 or the intra prediction processing element 255 based on certain criteria. In one embodiment, this selection process is based on whether the inter prediction processing element was able to successfully identify an appropriate reference frame within a defined period of time. If such a inter prediction reference frame was not timey identified, then intra mode prediction is selected and corresponding predicted luma and chroma objects are further transmitted into the pipeline.

A residual processing element 260 receives both chroma and luma objects along corresponding buses and generates residuals for these objects. These residuals are communicated on corresponding chroma and luma buses to a direct integer transform/quantize and scale processing element 280 such that chroma and luma transformed, quantized and scaled coefficients are generated. These coefficients are transported along corresponding chroma and luma buses to the entropy encoder processing element 275.

The entropy encoder processing element 275 also receives motion vector information along the motion vector bus corresponding to the macroblock being encoded. The entropy encoder 275 encodes the macroblock according to one of a number of different encoding modes.

One skilled in the art will recognize the many benefits for providing discrete luma, chroma, motion vector, and parameter buses within an integrated codec. Performance issues such as timing across the pipelined processing elements, size and distribution of integrated memory, power consumption, and computational latency are all improved because of the efficient and massively paralleled manner in which objects are transported throughout the system and delivered to all necessary processing elements therein.

Figure 3:
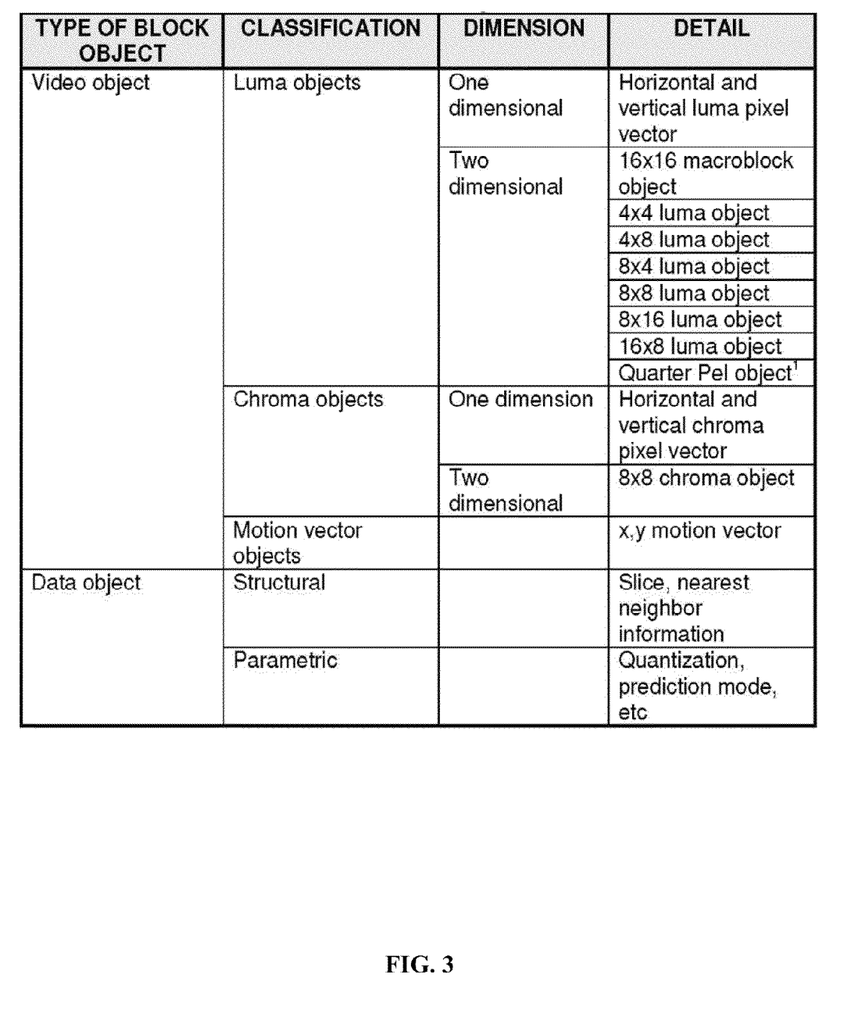
FIG. 3 is a general illustration of a processing element within the video codec system according to various embodiments of the invention.

FIGS. 3 illustrates an example showing a manner in which video may be divided into corresponding object types and object classifications. Video may be partitioned into objects based on its size, function and/or type. As shown, video is divided into video objects comprising luma objects, chroma objects and motion vector objects. Luma objects may include one dimensional objects such as horizontal and vertical luma pixel vectors as well as two dimensional objects including 16×16 macroblocks, 4×4 luma objects, 4×8 luma objects, 8×4 luma objects, 8×8 luma objects, 8×16 luma objects, 16×8 luma objects as well as half and/or quarter pel objects. These various luma objects are communicated on discrete luma bus(es) between the different processing elements.

Chroma objects may also include one dimensional objects such as horizontal and vertical chroma pixel vector information or two dimensional objects such as 8×8 chroma objects. Motion vector objects include x,y motion vector information that temporally relate a macroblock with a reference block across one or more video frames.

Data objects comprise structural objects, context objects and parametric objects. A structural object contains information related to slice data, nearest neighbor data, etc. A parametric object contains information related to quantization mode, prediction mode, etc. A context object contains information related to the number of nonzero coefficients in the direct integer transform of the residual. Blocks processed by the encoder have an associate context nC. Typically, the constant nC is evaluated as the average of nA and nC, where nA is the number of nonzero coefficients in the left neighbor, and nB is the number of nonzero coefficients in the top neighbor. In certain embodiments, the context nC determines the table entry for code lookup, and is dynamically evaluated for blocks processed by the encoder.

One skilled in the art will recognize that other video or data information may be incorporated within an object and transported along a corresponding bus within a multi-bus codec architecture.

The implementation of a multi-bus architecture within a paralleled pipelined system or loosely pipelined system allows for more efficient timing of operations being performed within various processing elements in the pipeline. For example, a particular processing element may only require a particular amount of the time to complete its operation when compared to the time required to a subsequent operation on another processing element. In certain embodiments, the amount of paralleled data delivered to a process element may vary depending on the amount and/or time required to process the data.

The maintenance of timing across processing elements is a challenge because of the significantly diverse amount of operations performed across the different processing elements. In particular, certain processing elements may require greater than a hundred times more calculations than other processing elements within the pipeline or loose pipeline. One important factor in maintaining timing within such a pipeline is the ability to deliver blocks of data (i.e., objects) in a paralleled format that enables massive parallel processing for those blocks requiring relatively larger amounts of calculations.

Figure 4:
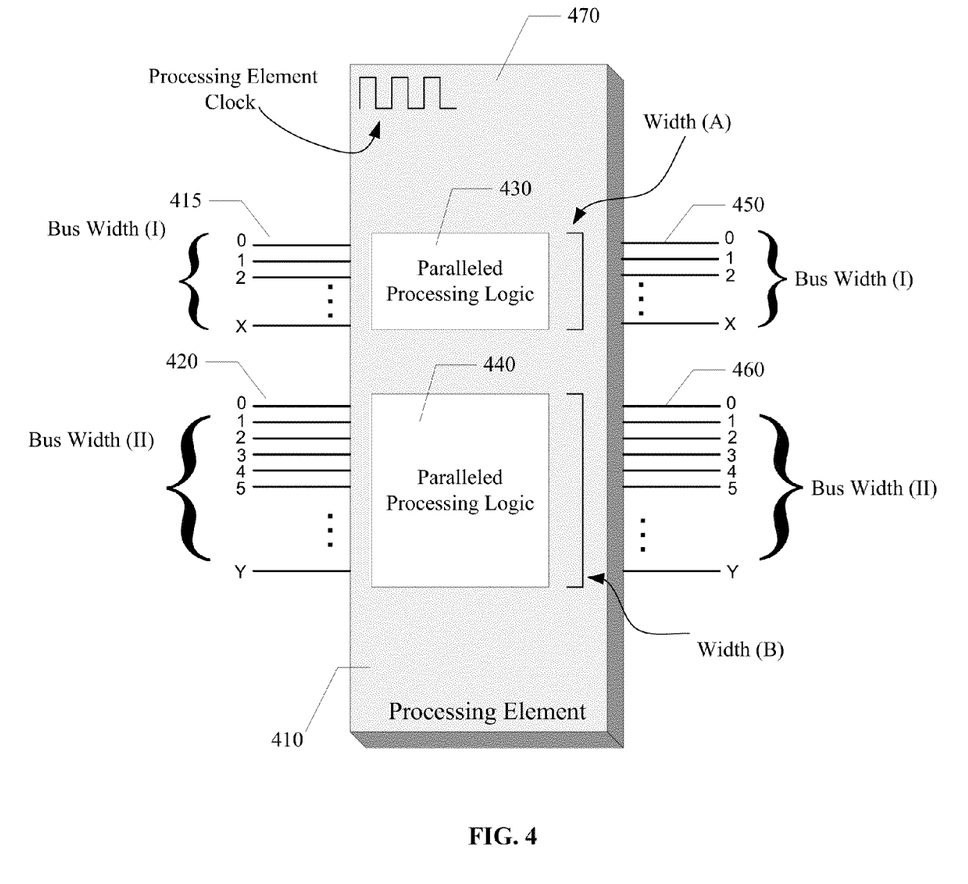
FIG. 4 is an example of different object types and classifications that may be communicated within the multi-bus video codec architecture according to various embodiments of the invention.

FIG. 4 is a general illustration of a processing element according to various embodiments of the invention. This figure illustrates the advantage of being able to deliver massively paralleled objects to a processing element in a manner that corresponds to the amount of internal parallel processing paths within the element itself. This ability drastically reduces the size of the bus interface hardware by removing formatting components, such as a SERDES (serializer/deserializer), that are typically required in many prior art systems. For purposes of clarity, a massively paralleled bus may be defined as having a bit width that is greater than 132 bits.

Referring to FIG. 4, a processing element has multiple, discrete bus interfaces that couple to different buses. In this particular example, the processing element 410 receives a first object on a first bus 415. This first bus has a first bus width (I) corresponding to X parallel bits. This first object is delivered to a first set of paralleled processing logic 430 having a width (A) that is equal or approximately equal to width (I). As a result, the first set of paralleled processing logic 430 is able to seamlessly interface with the first bus 415 with minimal formatting components between.

A second object is delivered on a second bus 420 having a second bus width (II) corresponding to Y parallel bits. This second object is delivered to a second set of paralleled processing logic 440 having a width (B) that is equal or approximately equal to width (II). As with the first object, the second object is seamlessly delivered to the second set of paralleled processing logic 430 from the second bus 420 within minimal formatting components between.

One skilled in the art will recognize that the difference in widths between the first and second buses/paralleled processing logic allows a designer to improve timing of operations between the first and second objects. In this instance, assuming that the second object requires more calculations than the first object, by having the width of the second bus 420 and second processing logic 440 be relatively larger than the first bus 415 and processing logic 430, the processing time of each object within the processing element may be approximately equalized.

In certain embodiments of the invention, the efficient pass-through of objects within the processing element 410 is further enhanced by having the widths of output buses 450, 460 correspond to the paralleled processing logic and input buses.

The ability to maintain timing across processing elements within a pipeline/loose pipeline may be further enhanced by providing different clocking rates on processing elements. As shown, the processing element 410 has an internal clock 470 that is used to define the speed at which calculations occur on the element. If certain elements have significantly larger amounts of calculations than other elements, then the clock on these certain elements may be increased to compensate for the calculation count differential and bring the timing of the elements more in-line.

As shown above, the ability to deliver different objects using different bus sizes within a pipelined video codec can significantly improve the relative timing and computational latency performance of the processing elements within the pipeline/loose pipeline. To further improve this performance, certain processing elements may operate in parallel or at least partially operate in parallel within the pipeline/loose pipeline to further improve latency performance.

Figure 5:
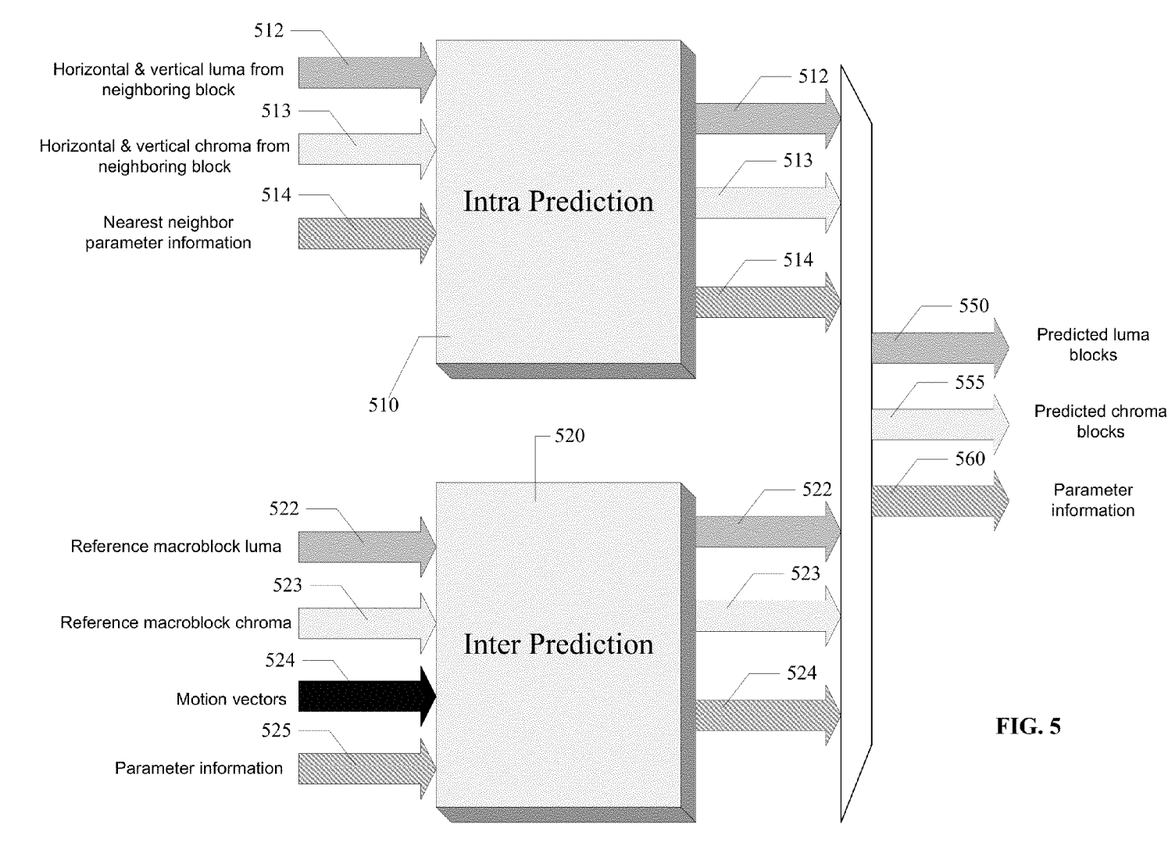
FIG. 5 is an example of intra and inter prediction modules and associated bus interfaces according to various embodiments of the invention.

FIG. 5 illustrates an example in which intra prediction operations and inter prediction operations are performed in parallel according to various embodiments of the invention. In this example, both intra prediction calculations and inter prediction calculations are performed in parallel prior to the selection of a prediction mode for the macroblock. This paralleling of inter and intra calculations reduces the overall time required to encode the macroblock.

The inter prediction processing element 520 receives various information related to motion estimation as well as half and/or quarter pel calculations. In this example, a reference luma macroblock is received on a luma bus 522 from an integrated cache. A reference chroma macroblock is received on a chroma bus 523 from the integrated cache. A motion vector 524 is received on a motion vector bus 524 from a motion estimation module or a cache. Parameter information, such as a prediction mode, is received on a parameter bus 525. Each of these buses has a different bus width due in part to the type of object being transported as well as the amount of calculations being performed within the inter prediction processing element 520.

The intra prediction processing element 510 receives various information related to spatial compression of the macroblock including neighboring pixel information on the x and y planes. In this example, horizontal and vertical luma information from neighboring blocks is received on a luma bus 512. Horizontal and vertical chroma information from neighboring blocks is received on chroma bus 513. Nearest neighbor parameter information, such as an intra prediction mode, is received on parameter bus 514. As is the case with inter prediction, each of these buses has a different bus width due in part to the type of object being transported as well as the amount of calculations being performed within the intra prediction processing element 510.

In certain embodiments of the invention, a prediction mode is selected based on priority given to inter mode prediction. If the inter prediction processing element 520 is able to identify an acceptable reference block temporally located in another frame, then the corresponding prediction mode is selected. However, if the inter prediction processing element 520 is unable to identify an acceptable reference block, then an intra mode is selected. Because the inter prediction and intra prediction processing elements operate in parallel, the intra prediction processing element 510 has at least performed some of its calculations prior to the inter mode processing element 520 completing its calculations.

In many instances, the inter prediction processing element 520 is required to perform significantly more operations than the intra prediction processing element 510. In certain embodiments of the invention, the inter prediction processing element 520 is clocked at a higher rate than the intra prediction processing element 510 in order to maintain timing between the two elements. Additionally, the luma bus interface 522 on the inter prediction processing element 510 is sufficiently wide so that half pel and/or quarter pel operations may be performed in real-time without having to store previous half and/or quarter pel calculations of reference blocks. Rather, half and/or quarter pel calculations are performed within a short time period (i.e., a single clock cycle) for a reference macroblock each time this data is required. As a result, memory accesses during half and/or quarter pel operations are significantly reduced, further improving computational latency.

A multiplexer 580 or other selection device is coupled to output buses on the inter and intra prediction processing elements. Based on the mode selected, a set of buses is selected and output from the multiplexer 580. In any event, the output of the multiplexer 580 comprises a luma bus 550, on which a predicted luma block is transported, a chroma block 555, on which a predicted chroma block is transported, and a parameter bus 560, on which corresponding parameter information is transported.

One skilled in the art will recognize the advantages of such a multi-bus architecture provides in enabling proper timing between paralleled processing elements. In addition, as will be discussed later, the multi-bus architecture significantly reduces the number of memory fetches required in inter prediction, which further allows timing symmetry between the two processing modules and reduces computational latency.

Figure 6:
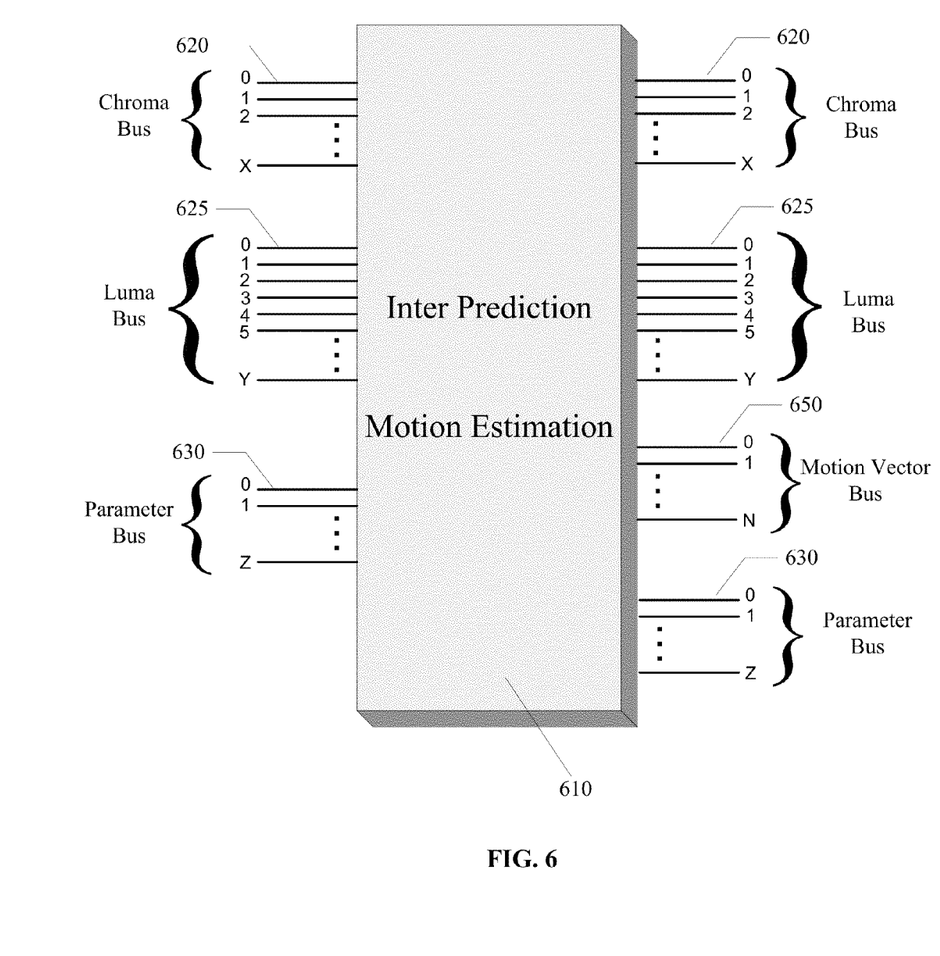
FIG. 6 illustrates examples of relative bus widths on a plurality of buses that interface with an inter prediction/motion estimation module according to various embodiments of the invention.

FIG. 6 illustrates multi-bus connectivity of an inter prediction/motion estimation processing element according to various embodiments of the invention. As shown, the inter prediction/motion estimation processing element 610 is coupled to different buses on which different types of objects are received and transmitted. The width of each of these buses is different to facilitate a relatively seamless transition from the paralleled object on a bus into corresponding paralleled logic within the processing element 610. These varying widths on the different buses support massively paralleled calculations performed on certain objects progressing through the processing element 610.

The inter prediction/motion estimation processing element 610 is coupled on its inputs to a chroma bus 620, luma bus 625 and parameter bus 630. The majority of calculations are performed on luma objects so that the luma bus 625 and associated internal paralleled logic contain the most number of paralleled bits, shown as Y. Note that the bus widths are not drawn to scale and in many embodiments the width of the luma bus 625 is significantly larger than either the chroma bus 620 or the parameter bus 630. This massively paralleled bus allows the processing element to perform operations in parallel for very large number of bits within a luma object as well as luma reference blocks. In certain embodiments, the width of this luma bus 625 is sufficiently large to enable quarter and half pel calculations to be performed in a single clock cycle, which obviates the necessity to store such calculations within a cache as well as significantly increases the speed in which quarter and half pel operations may be performed and reduces computational latency.

The inter prediction/motion estimation processing element 610 is also coupled on its outputs to the chroma bus 620, luma bus 625, parameter bus 630 and a motion vector bus 650. These outputs transmit predicted chroma and luma objects as well as associated parameter information. The output motion vector bus 650 outputs motion vectors calculated during motion estimation operations. Once again, the widths of each of these buses correspond to the type of object being communicated.

Figure 7:
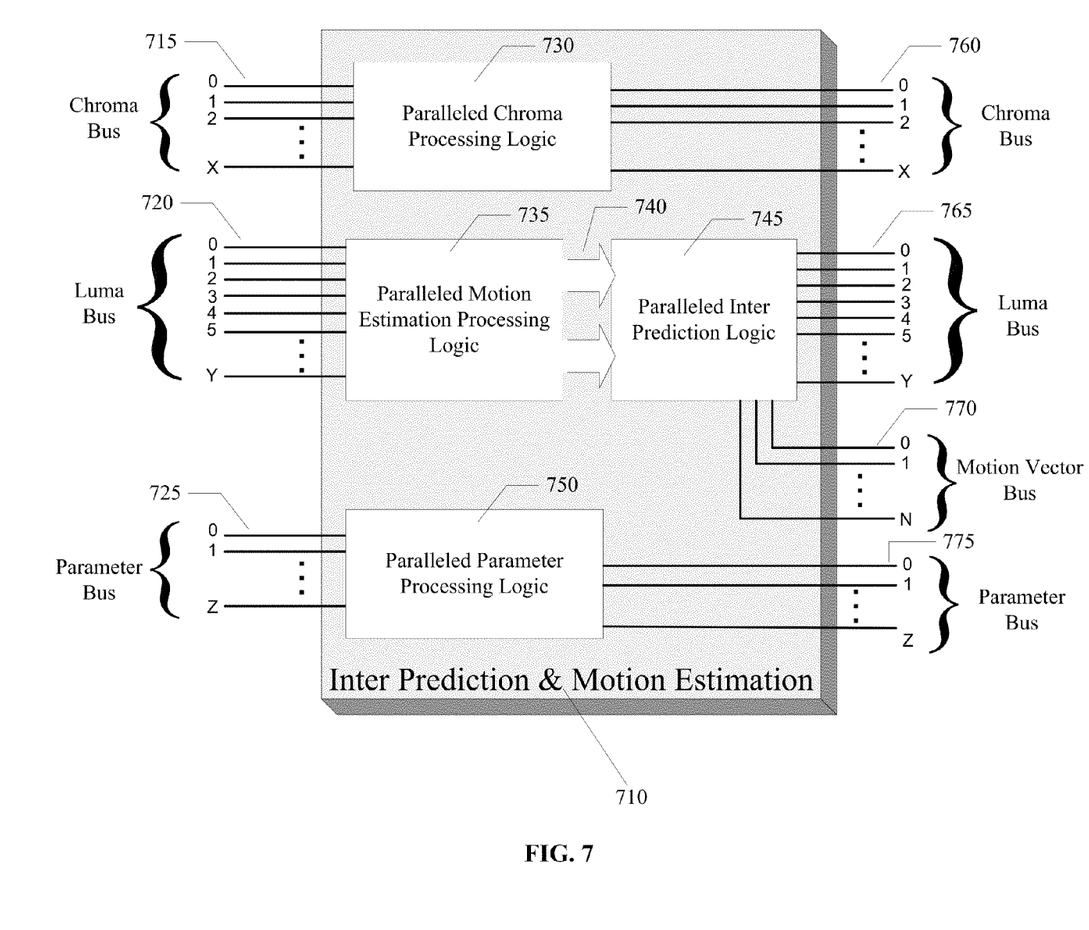
FIG. 7 illustrates multi-bus interfaces of a inter prediction/motion estimation module and certain associated processing logic therein according to various embodiments of the invention.

FIG. 7 illustrates a more detailed representation of paralleled objects on different buses and corresponding internal paralleled processing logic within an inter prediction/motion estimation processing element according to various embodiments of the invention. This figure also illustrates paralleled bus structures within a processing element between a motion estimation module and inter prediction module.

In this figure, the inter prediction/motion estimation processing element 710 receives chroma objects on a chroma bus 715, luma objects on a luma bus 720 and parameter objects on a parameter bus 725. Once again, the widths of each of these buses will vary depending on the type of object being transported.

Chroma objects are transported to the processing element 710 on the chroma bus 715, having a width of X−1 bits, and processed by paralleled chroma processing logic 730. A predicted chroma block is generated and transported on chroma bus 760. In one implementation of the invention, the predicted chroma block is identified based exclusively on operations performed on a corresponding luma block such that the paralleled chroma processing logic 730 is primarily pass-through logic that provides the predicted chroma block from analysis on a correspond luma block. In another implementation, the paralleled chroma processing logic 730 interfaces with inter prediction logic from which the predicted chroma block is generated.

Luma objects are transported to the processing element 710 on the luma bus 720, having a width of Y−1 bits, and processed by paralleled motion estimation processing logic 735. This paralleled motion estimation processing logic 735 has the same width or approximately the same width as the luma bus 720. The paralleled motion estimation processing logic 735 provides coarsely predicted luma blocks as well as motion vector information to an inter prediction module 745 using an internal multi-bus structure 740. The paralleled inter prediction logic 745 performs certain calculations related to fine adjustments in temporal predictions and generates finely predicted luma blocks and corresponding motion vector information. The finely predicted luma block is transported on luma bus 765 and the motion vector information is transported on motion vector bus 770. Additionally, in certain embodiments, a finely predicted chroma block is transported on chroma bus 760.

Parameter objects are transported to the processing element 710 on the parameter bus 735, having a width of Z−1 bits, and processed by paralleled parameter processing logic 750. Parameter objects are generated corresponding to predicted luma and chroma blocks and transported on parameter bus 775.

This multi-bus architecture around and internal to the inter prediction/motion estimation processing element 710 allows object timing to be maintained through the processing element 710. In particular, luma objects require substantially more computations than chroma objects and parameter objects. In addition, in certain embodiments, motion vectors are identified exclusively on the computations on luma objects. Accordingly, by the use of a luma bus and luma processing logic, timing between luma objects, chroma objects and parameter information can be maintained.

Figure 8:
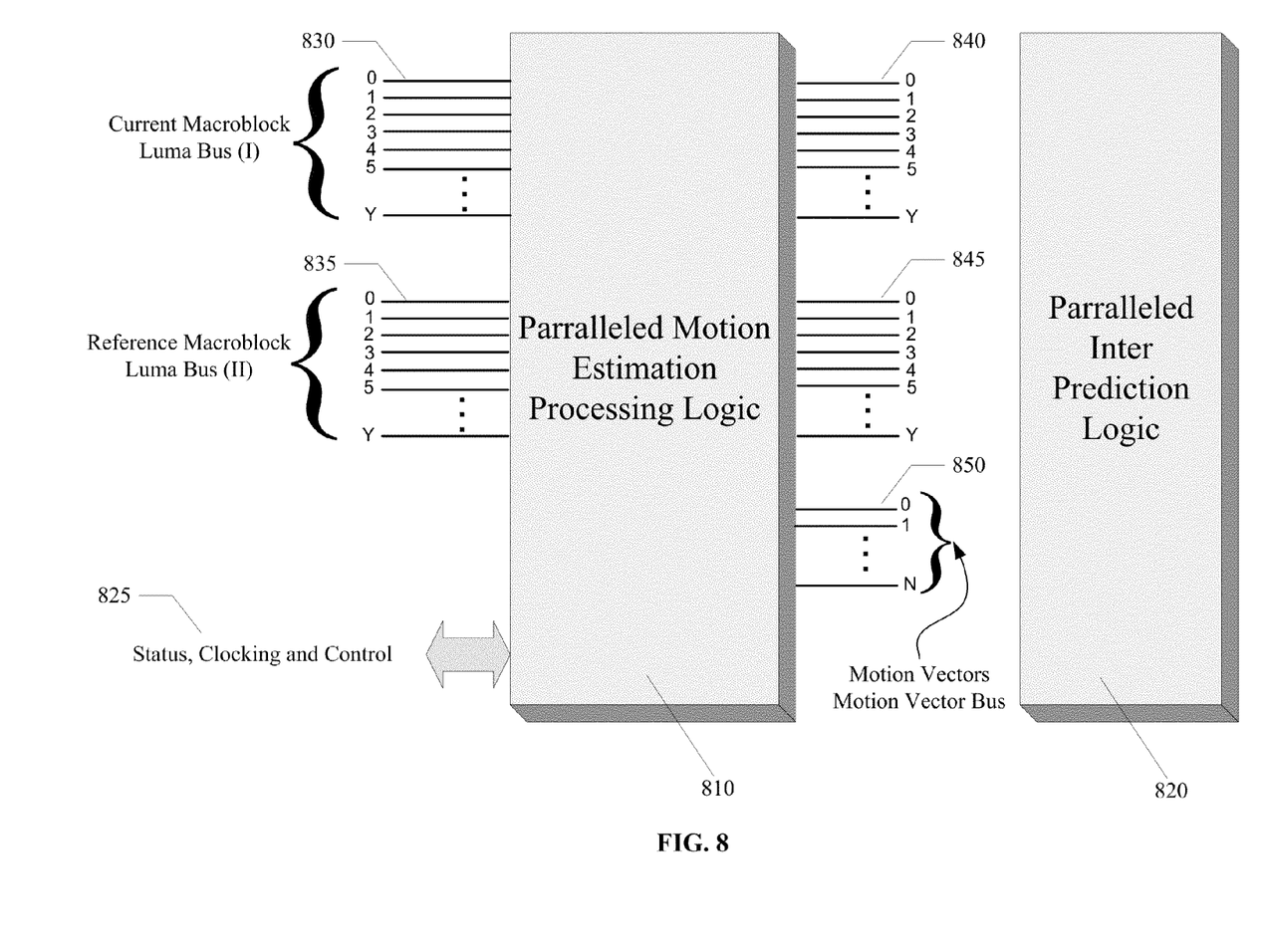
FIG. 8 is illustrates exemplary paralleled motion estimation processing logic and paralleled inter prediction logic, both with associated bus interfaces according to various embodiments of the invention.

FIG. 8 illustrates a more-detailed illustration of bus connectivity between the motion estimation module and the inter prediction module according to various embodiments of the invention. As shown, a current luma macroblock or object is provided on a first luma bus 830 and a reference macroblock is provided on a second luma bus 835. Using both a current luma object and a reference macroblock, corresponding motion estimation calculations may be performed by the logic. This example highlights the fact that a particular bus may in actuality provide multiple objects in parallel, which would further increase the system performance.

The paralleled motion estimation processing logic may also receive status, clocking and control information on interface 825.

The paralleled motion estimation processing logic generates a coarsely predicted luma object information that may include the predicted luma reference macroblock and predicted current luma object and corresponding motion vector. The predicted luma reference macroblock is transported to paralleled inter prediction logic 820 on luma bus 845. The predicted current luma object is transported to paralleled inter prediction logic 820 on luma bus 840. The corresponding motion vector is transported to paralleled inter prediction logic 820 on motion vector bus 850, having a width of N−1 bits.

The paralleled inter prediction logic 820 performs a fine temporal prediction in half and/or quarter pel analysis. Because of the massively paralleled delivery of reference macroblocks, quarter and/or half pel calculations may be performed in a very short period of time (e.g., one or two clock cycles) for a reference macroblock. Accordingly, these quarter and half pel calculations do not need to be stored and subsequently fetched but performed in real-time each instance this information is required.

Figure 9:
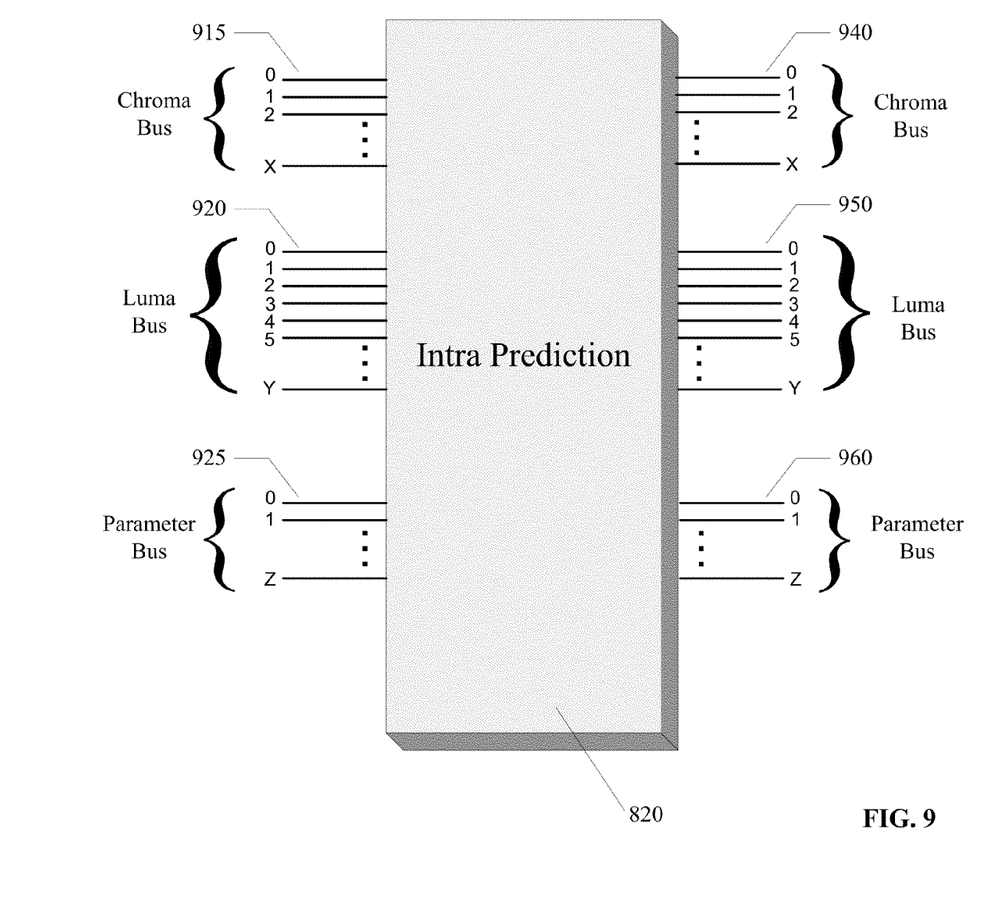
FIG. 9 illustrates examples of relative bus widths on a plurality of buses that interface with an intra prediction module according to various embodiments of the invention.

FIG. 9 illustrates a multi-bus architecture around an intra prediction processing element 910 according to various embodiments of the invention. In particular, the objects are delivered to and transmitted from the processing element 910 using a plurality of buses.

Chroma objects are provided on a chroma bus 915, processed within the intra prediction processing element 910 and transmitted on chroma bus 940. As previously discussed, the width of chroma bus 915 and chroma bus 940 are equal to or approximately equal to the internal chroma processing logic within the intra prediction processing element 910.

Luma objects are provided on a luma bus 920, processed within the intra prediction processing element 910 and transmitted on luma bus 950. The luma bus 920 may transport a luma macroblock or sub-block (other two-dimensional blocks within the macroblock) and horizontal or vertical neighbor pixels that may be used in intra prediction. Once again, the massive width of this bus allows intra prediction calculation to be performed in parallel such that intra prediction modes may be calculated relatively quickly while reducing the number of memory accesses for reference blocks, reducing computational latency.

Parameter objects are provided on a parameter bus 925, processed within the intra prediction processing element 910 and transmitted on parameter bus 960. This parameter object may contain parameter information such as an intra mode identified for the intra predicted blocks.

Figure 10:
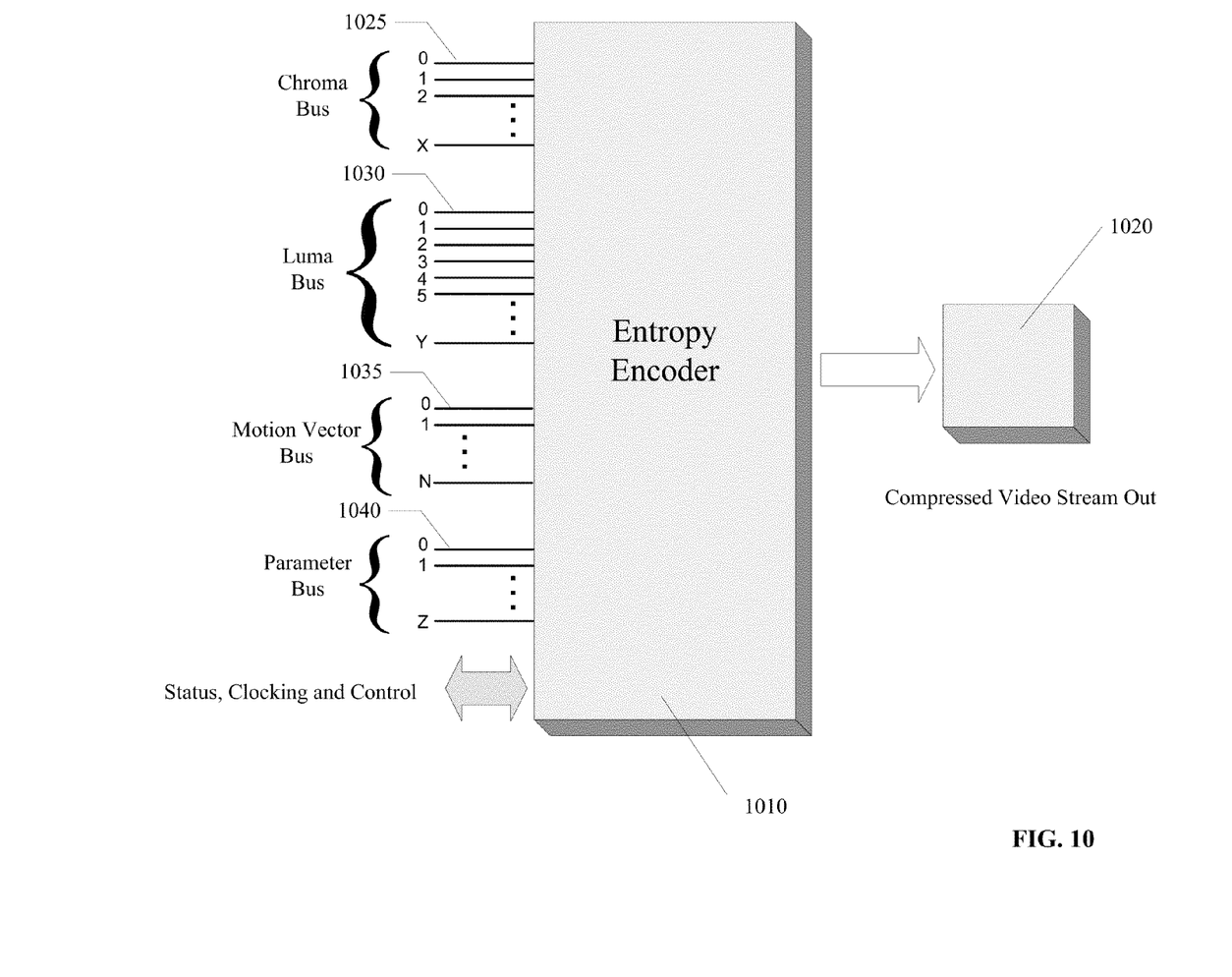
FIG. 10 is an exemplary entropy encoder and associated bus interfaces according to various embodiments of the invention.

FIG. 10 illustrates a multi-bus architecture around an entropy encoder 1010 according to various embodiments of the invention. The entropy encoder 1010 encodes a transformed, quantized and scaled residual macroblock according to one of multiple available encoding modes. Examples of these encoding modes may include those defined by the H.264 standard. In order to perform these encoding operations, the entropy encoder 1010 must have received luma, chroma, motion vector and parameter information in a timely manner. According to various embodiments of the invention, these objects are delivered to the entropy encoder 1010 using a plurality of buses.

Chroma objects are provided on a chroma bus 1025, encoded within the entropy encoder 1010 and inserted within a compressed video stream 1020. The width of the chroma bus 1025 may be defined as X−1 bits wide and correspond to processing logic within the entropy encoder 1010.

Luma objects are provided on a luma bus 1030, encoded within the entropy encoder 1010 and inserted within the compressed video stream 1020. The width of the luma bus 1030 may be defined as Y−1 bits wide and also correspond to certain processing logic within the entropy encoder 1010. In many instances, the width of the luma bus 1030 will be larger than the width of the chroma bus 1025.

Motion vector objects are provided on a motion vector bus 1035, encoded within the entropy encoder 1010 and inserted within the compressed video stream 1020. The width of the motion vector bus 1035 may be defined as N−1 bits wide and also yet correspond to specific processing logic within the entropy encoder 1010. In most instances, the motion vector bus 1035 will be smaller than the chroma bus 1025 and the luma bus 1030.

Parameter objects are provided on a parameter bus 1040 which are used to encode the other objects. For example, a parameter object may include an encoding mode in which a particular object is to be encoded. Additionally, status, clocking and control information may also be provided to the entropy encoder 1010.

One skilled in the art will recognize that the multi-bus architecture may be applied to various processing elements within the codec architecture. Additionally, one skilled in the art will recognize that the different buses may vary in length to support different types of objects. Furthermore, the multi-bus architecture may support a single cache memory implementation as well as a distributed cache memory implementation.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A multi-bus video codec architecture comprising:
a plurality of processing elements;
a cache that stores data used by at least one processing element, within the plurality of processing elements, to process a macroblock being encoded within the video codec architecture;
at least one luma bus, coupled to at least two processing elements within the plurality of processing elements, the at least one luma bus having a first width and transporting a plurality of luma objects between the at least two processing elements;
at least one chroma bus, coupled to the at least two processing elements, the at least one chroma bus having a second width and transporting a plurality of chroma objects between the at least two processing elements, a first subset of the plurality of chrome objects and a second subset of the plurality of luma objects being communicated on two separate buses for at least one process among motion prediction, residual estimation and transformation, quantization, and entropy encoding; and
at least one motion vector bus, coupled to the at least two processing elements, the at least one motion vector having a third width and transporting a plurality of motion vector information between the at least two processing elements.

2. The multi-bus video codec architecture of claim 1 further comprising at least one parameter bus, coupled to the at least two processing elements, the at least one parameter bus having a fourth width and transporting parameter information between the at least two processing elements.

3. The multi-bus video codec architecture of claim 2 wherein the fourth width is a different width than the first width, the second width and the third width.

4. The multi-bus video codec architecture of claim 1 wherein the first width, the second width and the third width are different lengths.

5. The multi-bus video codec architecture of claim 1 wherein the plurality of processing elements are positioned within a pipelined processing system.

6. The multi-bus video codec architecture of claim 1 wherein the plurality of processing elements comprises an inter prediction/motion estimation processing element that identifies an inter mode for the macroblock, the inter prediction/motion estimation processing element being coupled to the at least one chroma bus, the at least one luma bus and the at least one motion vector bus.

7. The multi-bus video codec architecture of claim 6 wherein the at least one luma bus transports a plurality of reference blocks, temporally located from the macroblock, from the cache to the inter prediction/motion estimation processing element.

8. The multi-bus video codec architecture of claim 7 wherein the cache is a distributed cache.

9. The multi-bus video codec architecture of claim 7 wherein the inter prediction/motion estimation processing element comprises paralleled chroma processing logic having a width equal or approximately equal to the at least one chroma bus.

10. The multi-bus video codec architecture of claim 7 wherein the inter prediction/motion estimation processing element comprises paralleled luma processing logic having a width equal or approximately equal to the at least one luma bus.

11. The multi-bus video codec architecture of claim 7 wherein the inter prediction/motion estimation processing element comprises paralleled parameter processing logic having a width equal or approximately equal to the at least one parameter bus.

12. The multi-bus video codec architecture of claim 7 wherein the inter prediction/motion estimation processing element comprises a motion estimation module and an inter prediction module being coupled by a first chroma bus, a first luma bus and a first motion vector bus.

13. The multi-bus video codec architecture of claim 12 wherein the inter prediction module is coupled to a second luma bus on which a reference block is retrieved from the cache, the second luma bus having a width sufficient to allow a quarter pel calculation to be performed on the reference block within a single clock cycle.

14. The multi-bus video codec architecture of claim 1 wherein the plurality of processing elements comprises an intra prediction processing element that identifies an intra mode for the macroblock, the intra prediction processing element being coupled to the at least one chroma bus and the at least one luma bus.

15. The multi-bus video codec architecture of claim 14 wherein the intra prediction processing element comprises paralleled chroma processing logic having a width equal or approximately equal to the at least one chroma bus.

16. The multi-bus video codec architecture of claim 14 wherein the intra prediction processing element comprises paralleled luma processing logic having a width equal or approximately equal to the at least one luma bus.

17. The multi-bus video codec architecture of claim 14 wherein the intra prediction processing element comprises paralleled parameter processing logic having a width equal or approximately equal to at least one parameter bus.

18. A method for transporting a diverse set of objects within a video codec, the method comprising:
generating a plurality of chroma blocks and a plurality of luma blocks from a digital video stream;
transporting at least one chroma block, within the plurality of chroma blocks, on a discrete chroma bus within a video codec, the discrete chroma bus having a first width;
transporting at least one luma blocks, within the plurality of luma blocks, on a discrete luma bus within the video codec, the discrete luma bus having a second width being larger than the first width, the discrete luma bus and the discrete chroma bus being respectively coupled to provide the at least one luma block and the at least one chroma block for at least one process among motion prediction, residual estimation and transformation, quantization, and entropy encoding; and
generating a motion vector using the at least one luma block and transporting the motion vector on a discrete motion vector bus within the video codec, the motion vector bus having a third width being smaller than the first and second widths.

19. The method of claim 18 wherein the video codec is configured in a loose pipelined processing architecture.

20. The method of claim 18 further comprising the steps of:
generating parameter information associated with the at least one chroma block and the at least one luma block; and
transporting the parameter information on a discrete parameter bus having a fourth width being small than the first and second widths.

21. The method of claim 18 wherein the discrete luma bus is coupled to a cache and fetches a reference luma block for inter prediction analysis.

22. The method of claim 21 wherein the cache is a distributed cache.

23. The method of claim 22 wherein quarter pel calculations are performed within inter prediction analysis without fetching previously performed quarter pel data from the distributed cache.

24. The method of claim 18 wherein the motion vector bus is coupled between a motion estimation module and an inter prediction module and the motion vector is generated in the motion estimation module and provided to the inter prediction module on the motion vector bus.

25. A processing element within a multi-bus, loose pipelined codec architecture, the processing element comprising:
a first bus interface having a first width on which a first object is received, the first object relating to a first video component of a compressed video block;
a first set of paralleled processing logic, coupled to the first bus interface, the first set of paralleled processing logic having a second width that is equivalent or approximately equivalent to the first width, the first set of paralleled processing logic performing a first set of arithmetic operations on the first object;
a second bus interface having a third width on which a second object is received, the second object relating to a second video component of the compressed video block;
a second set of paralleled processing logic, coupled to the second bus interface, the second set of paralleled processing logic having a fourth width that is equivalent or approximately equivalent to the third width, the second set of paralleled processing logic performing a second set of arithmetic operations on the second object; and
a clock, coupled to the first and second sets of paralleled processing logic, the clock providing timing for the first and second sets of arithmetic operations in which the first and second bus interferences are respectively coupled to provide the first and second objects for at least one process among motion prediction, residual estimation and transformation, quantization, and entropy encoding.

26. The processing element of claim 25 wherein the processing element is a motion estimation/inter prediction processing element and the first bus interface is a chroma bus interface and the second bus interface is a luma bus interface.

27. The processing element of claim 25 wherein the processing element is a intra prediction processing element and the first bus interface is a chroma bus interface and the second bus interface is a luma bus interface.

28. The processing element of claim 25 wherein the clock has a rate that is different than at least one clock in at least one other processing element within the loose pipelined architecture.

29. The processing element of claim 28 wherein the processing element is a motion estimation/inter prediction processing element and the at least one other processing element is an intra prediction processing element.

* * * * *